United States Patent
Kuroda

(10) Patent No.: US 8,412,194 B2
(45) Date of Patent: Apr. 2, 2013

(54) WIRELESS TERMINAL DEVICE AND METHOD OF CONTROLLING THE SAME

(75) Inventor: Mikiro Kuroda, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 147 days.

(21) Appl. No.: 13/117,239

(22) Filed: May 27, 2011

(65) Prior Publication Data

US 2011/0294459 A1 Dec. 1, 2011

(30) Foreign Application Priority Data

May 27, 2010 (JP) ................................ 2010-121259

(51) Int. Cl.
*H04W 4/00* (2009.01)

(52) U.S. Cl. .................... 455/435.1; 455/432.1

(58) Field of Classification Search ..... 455/432.1–435.3
See application file for complete search history.

(56) References Cited

U.S. PATENT DOCUMENTS

2004/0152462 A1* 8/2004 Hwang ..................... 455/432.1

FOREIGN PATENT DOCUMENTS

JP 2009-130602 A 6/2009

* cited by examiner

*Primary Examiner* — Steven Lim
(74) *Attorney, Agent, or Firm* — Hoffmann & Baron, LLP

(57) ABSTRACT

An object of the present invention is to provide a wireless terminal device and a method of controlling the same, which can receive a broadcast message transmitted from a base station, without increasing the load on a base station that refuses location registration and on the communication line thereof. The cellular telephone device includes: a search unit that searches for a base station, from which a signal can be received; and a reception control unit in which, in a case in which location registration was not permitted in all of the base stations found, the reception control unit performs synchronous processing for a reception signal from one of the base stations in which location registration was not permitted, without performing location registration, and enters a reception stand-by state for a broadcast message from the one of the base stations.

11 Claims, 5 Drawing Sheets

WIRELESS TERMINAL DEVICE AND METHOD OF CONTROLLING THE SAME

This application is based on and claims the benefit of priority from Japanese Patent Application No. 2010-121259 filed on 27 May 2010, the content of which is incorporated herein by reference.

BACKGROUND OF THE INVENTION

1. Field of the Invention

The present invention relates to a wireless terminal device and a method of controlling the same in which location registration with a base station and outgoing/incoming call processing are performed.

2. Related Art

Conventionally, as a base station, with which a cellular telephone device performs location registration, a small-sized base station realizing a femtocell is utilized, and the communication area of a femtocell (for example, within a radius of several tens of meters) is smaller than that of an ordinary base station such as in a macro cell and a micro cell. A communication system using such a femtocell is a system as a countermeasure for places outside a communication area such as a high-rise condominium and a shopping center, in which a plurality of small-sized base stations are installed, and audio or data communication is performed by using a broad band communication line (for example, see Japanese Unexamined Patent Application, Publication No. 2009-130602).

Here, the femtocell may be installed in, for example, an individual's house or the like. In such a case, if a cellular telephone device of a user other than the family members who own the base station undergoes location registration with the femtocell, the convenience for the original users (the family members) may be reduced, such as the transmission rate of the broad band line being reduced at the cost of the owner of the base station. Therefore, there is also a CSG (Closed Subscriber Group/Closed Service Group) cell that refuses location registration from anything other than particular cellular telephone devices. A base station of this CSG cell retains a list for identifying the cellular telephone devices for which connection is permitted, and refuses connection for any access from a cellular telephone device that is not registered in the list.

Incidentally, as an example of broadcasting a broadcast message to cellular telephone devices in the communication area of the base station, there is a service called BCSMS (Broadcast Short Messaging Services). BCSMS is a service that transmits a message of limited content (for example, 140 bytes) to an unspecified number of cellular telephone devices that are present in the communications area, by using a protocol called Short Messaging Service. BCSMS is similarly provided regardless of whether being in a femtocell or non-femtocell (macro cell, micro cell or pico cell), and is utilized, for example, in transmitting a newsflash or emergency earthquake alert.

SUMMARY OF THE INVENTION

However, in a case in which only a femtocell is present outside a communication area of the non-femtocell, the base station may refuse a cellular telephone device performing location registration with the femtocell. In such a case, the cellular telephone device cannot perform location registration with any base station, and thus enters a state of being outside a communication area, and cannot receive even a broadcast message such as BCSMS. When this occurs, a cellular telephone device has not been able to obtain even emergency information such as an earthquake alert transmitted as BCSMS or the like.

An object of the present invention is to provide a wireless terminal device and a method of controlling the same, which can receive a broadcast message transmitted from a base station, without increasing the load on the base station that refused location registration and on the communication line.

The wireless terminal device according to the present invention is a wireless terminal device that performs outgoing/incoming call processing via a base station with which location registration has been completed, and the wireless terminal device includes: a search unit that searches for a base station, from which a signal can be received; and a control unit that, in a case in which location registration is not permitted in all base stations found by the search unit, performs synchronous processing for a reception signal from one of the base stations in which location registration was not permitted, without performing location registration, and enters a reception stand-by state for a broadcast message from the one of the base stations.

Moreover, it is preferable that the control unit enters the reception stand-by state in response to receiving refusal information relating to the location registration from the one of the base stations that did not permit the location registration.

In addition, it is preferable that the control unit enters the reception stand-by state, in a case in which the refusal information includes reception permission data for the broadcast message.

In addition, it is preferable that the control unit enters the reception stand-by state, in a case in which the refusal information does not include reception refusal data for the broadcast message.

Furthermore, it is preferable that the control unit does not accept an outgoing call operation in the reception stand-by state.

Moreover, it is preferable that, in the reception stand-by state, in a case of detecting an outgoing call operation representing an emergency call, the control unit performs location registration and a call request for the one of the base stations with which the synchronous processing has been performed, and in a case of detecting other outgoing call operations, the control unit does not accept the outgoing call operations.

In addition, it is preferable that the wireless terminal device according to the present invention includes a display unit that displays a screen to indicate whether or not being in the reception stand-by state.

Furthermore, it is preferable that the search unit searches for a base station in a predetermined cycle in the reception stand-by state, and in a case in which the search unit finds a new base station that permits location registration, it is preferable that the control unit performs location registration with the new base station, and cancels the reception stand-by state.

Moreover, it is preferable that, the reception permission data is a predetermined parameter defined in 3GPP2.

In addition, it is preferable that the broadcast message is transmitted as BCSMS including emergency information.

The control method according to the present invention is a method of controlling a wireless terminal device including a control unit that performs outgoing/incoming call processing via a base station with which location registration has been performed, and the method includes the steps of: searching for a base station, from which a signal can be received by the control unit; and controlling such that, in a case in which location registration of the control unit was not permitted in all base stations found in the step of searching, synchronous processing is performed for a reception signal from one of the base stations in which location registration was not permitted, without performing location registration, and the control unit enters a reception stand-by state for a broadcast message from the one of the base stations.

According to the present invention, the wireless terminal device can receive a broadcast message transmitted from a base station, without increasing the load on the base station that refused location registration and on the communication line.

DETAILED DESCRIPTION OF THE INVENTION

A description is provided hereinafter for an example of an embodiment of the present invention. It should be noted that, in the present embodiment, a cellular telephone device 1 is described as an example of a wireless terminal device.

Figure 1:
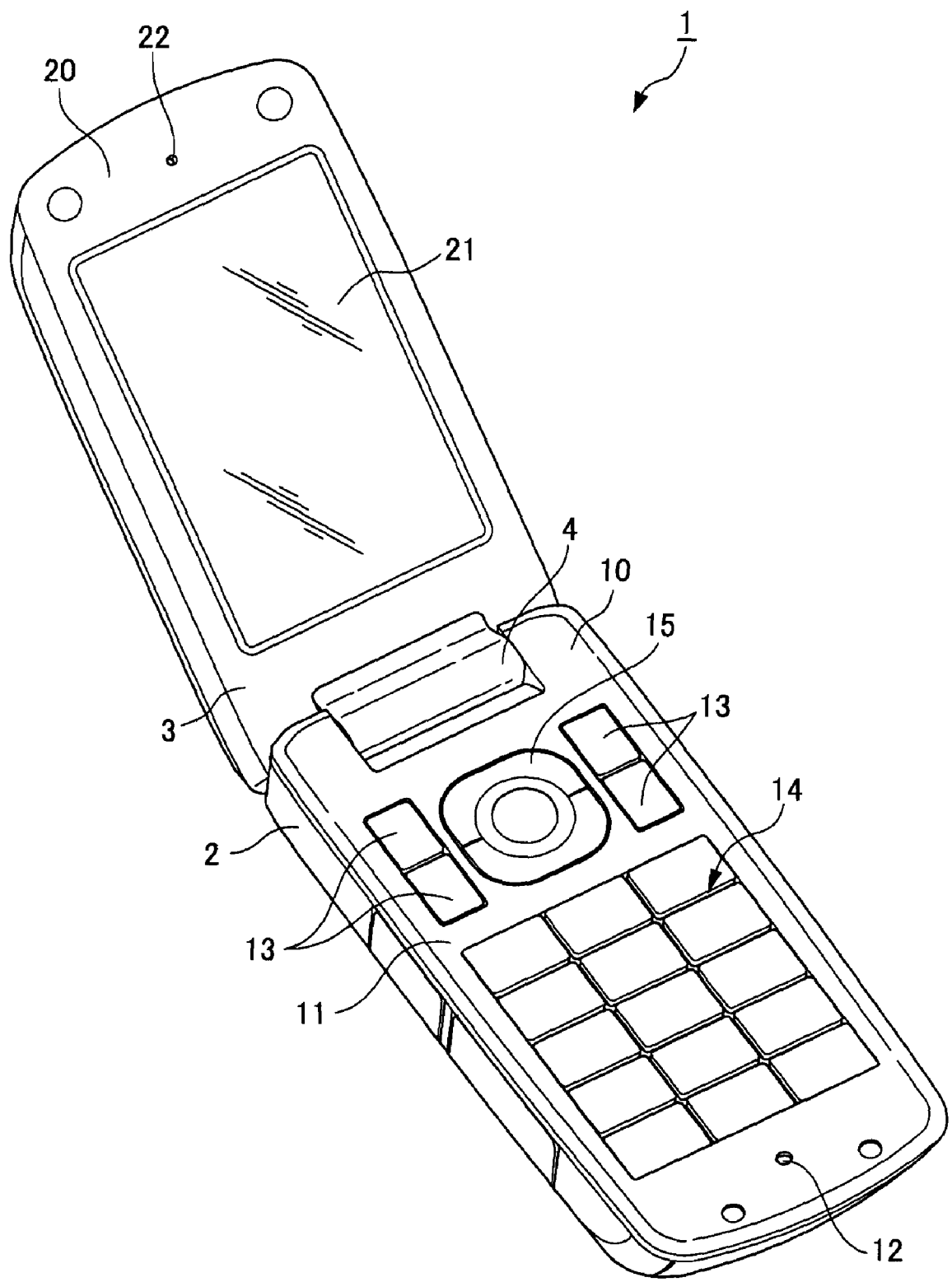
FIG. 1 is a perspective view showing an appearance of a cellular telephone device according to an embodiment of the present invention.

FIG. 1 is a perspective view showing an appearance of the cellular telephone device 1 according to the present embodiment. The cellular telephone device 1 is configured to include an operation unit side body 2 and a display unit side body 3. The operation unit side body 2 is configured to include, on a front face portion 10 thereof, an operation unit 11 and a microphone 12 to which sound produced by a user of the cellular telephone device 1 is input when the user is making a phone call or using a speech recognition application. The operation unit 11 is configured with: function setting operation buttons 13 for operating various functions such as for various setting functions, a telephone number directory function and a mail function; input operation buttons 14 for inputting the digits of a telephone number and characters for mail, etc.; and a selection operation button 15 for performing selection of various operations, scrolling, etc.

Moreover, the display unit side body 3 is configured to include, on a front face portion 20, a display unit 21 for displaying a variety of information, and a receiver 22 for outputting sound of the other party of the conversation.

In addition, an upper end portion of the operation unit side body 2 and a lower end portion of the display unit side body 3 are connected via a hinge mechanism 4. Furthermore, the cellular telephone device 1 can be arranged into a state where the operation unit side body 2 and the display unit side body 3 are apart from each other (opened state), and into a state where the operation unit side body 2 and the display unit side body 3 are contacting each other (folded state), by relatively rotating the operation unit side body 2 and the display unit side body 3, which are connected via the hinge mechanism 4.

Figure 2:
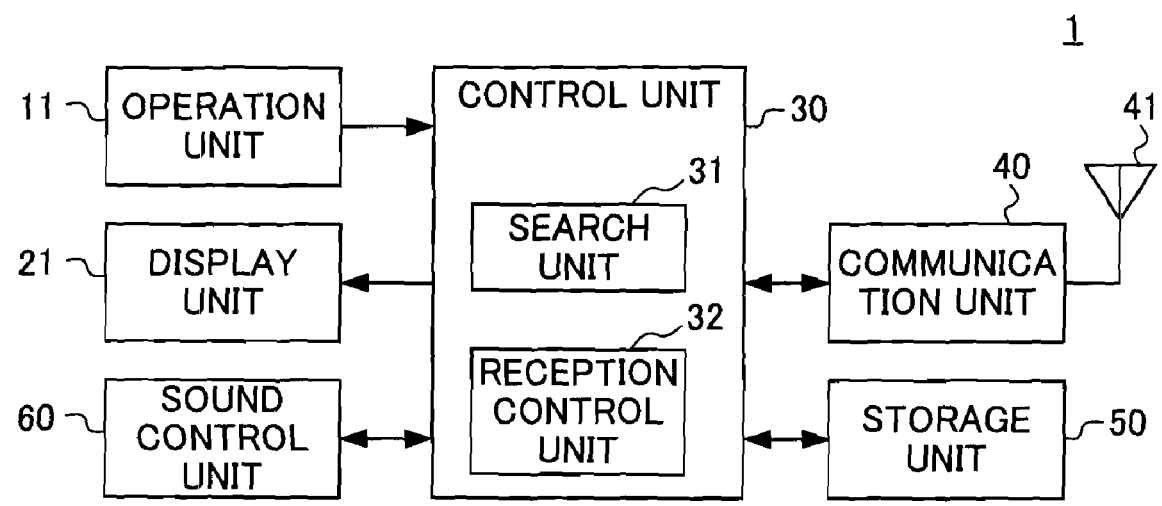
FIG. 2 is a block diagram showing functions of the cellular telephone device according to the embodiment of the present invention.

FIG. 2 is a block diagram showing functions of the cellular telephone device 1 according to the present embodiment. The cellular telephone device 1 includes the operation unit 11, the display unit 21, a control unit 30, a communication unit 40, an antenna 41, a storage unit 50, and a sound control unit 60.

The control unit 30 controls the entirety of the cellular telephone device 1, and performs, for example, predetermined control of the display unit 21, the communication unit 40, the sound control unit 60 and the like. Moreover, the control unit 30 accepts input from the operation unit 11 and the like to perform a variety of processing. In addition, when executing such processing, the control unit 30 controls the storage unit 50 to read various programs and data and write data. It should be noted that detailed functions of the control unit 30 according to the present embodiment will be described later.

The communication unit 40 communicates with external devices (base stations) at a predetermined usable frequency band (for example, 2 GHz band, 800 MHz band, and the like). Furthermore, the communication unit 40 performs demodulation processing on a signal received via the antenna 41 and provides the signal thus processed to the control unit 30, and in addition, performs modulation processing on a signal provided from the control unit 30 and transmits the signal to an external device via the antenna 41.

Here, in this particular example, the communication unit 40 is compatible with CDMA2000_1x_EVDO, which is a communication protocol being exclusively used for data communication; however, the communication unit 40 may be compatible with W-CDMA or LTE. Based on an instruction from the control unit 30, the communication unit 40 receives a broadcast message transmitted as BCSMS in accordance with this protocol, and provides the broadcast message to the control unit 30.

The storage unit 50 includes, for example, working memory, and is utilized for arithmetic processing by the control unit 30. Moreover, the storage unit 50 stores various programs according to the present embodiment. Furthermore, the storage unit 50 stores identification information of a femtocell (to be described later in detail) in which location registration is not permitted, but BCSMS can be received.

In accordance with control by the control unit 30, the sound control unit 60 performs predetermined sound processing on a signal transmitted from the communication unit 40, and outputs the signal thus processed to the receiver 22. The receiver 22 externally outputs the signal transmitted from the sound control unit 60. It should be noted that the signal may be output from a speaker (not illustrated) in place of the receiver 22 or in addition to the receiver 22. Moreover, in accordance with control by the control unit 30, the sound control unit 60 processes a signal, which is input from the microphone 12, and outputs the signal thus processed to the communication unit 40. The communication unit 40 performs predetermined processing on the signal transmitted from the sound control unit 60, and outputs the signal thus processed from the antenna 41.

Next, a detailed description is provided for functions of the control unit 30 in a case in which BCSMS is received. The control unit 30 includes a search unit 31 and a reception control unit 32.

The search unit 31 scans a predetermined frequency band to search for a base station from which a signal can be received. At this point in time, when the search unit 31 succeeds in acquiring a base station, and receives an overhead message in a pilot channel, the search unit 31 obtains a system identification number (System ID) and a network identification number (Network ID) included in the overhead message. Based on such identification numbers, the search unit 31 can determine whether the acquired base station is in a femtocell.

Subsequently, although the search unit 31 requests location registration from the acquired base station, in a case in which the base station is a femtocell and refuses the location registration, the base station transmits a location registration refusal message ((Extended) Global Service Redirection Message) to the cellular telephone device 1.

At this point in time, the base station in the femtocell imparts reception permission data, which indicates that reception of a broadcast message as BCSMS is permitted, to the location registration refusal message. More specifically, this reception permission data may be a predetermined parameter (return if fail) defined in 3GPP2. Since the purpose of this parameter is to permit the original communication system to be acquired if another communication system was not able to be acquired in a case in which the parameter is TRUE, this parameter is ordinarily set to FALSE in a case in which location registration is refused in the femtocell. In a case in which a broadcast message is permitted to be received, the base station in the femtocell sets the parameter to TRUE.

In a case in which the acquired base station is that of a femtocell, and reception permission data is imparted to the location registration refusal message, the search unit 31 stores identification information (PN (pseudo noise code) information for establishing code synchronization) of the acquired base station in the storage unit 50.

In a case in which location registration was not permitted in all base stations searched for by the search unit 31, if there are any femtocell base stations in which location registration was not permitted, the reception control unit 32 performs synchronous processing for a reception signal from one of the base stations without performing location registration. In addition, the reception control unit 32 enters a reception stand-by state for a broadcast message as BCSMS that may be transmitted from the one of the base stations.

Here, in the synchronous processing on the reception signal, more specifically, the reception control unit 32 refers to the storage unit 50 to identify PN information of one of the base stations in a femtocell, in which location registration was not permitted, but reception of a broadcast message as BCSMS is permitted. In addition, by using this PN information to acquire the one of the base stations, the reception control unit 32 establishes code synchronization.

In this way, in a case in which there is a femtocell in which location registration is not permitted but reception of a broadcast message as BCSMS is permitted, and there is not a nearby cell (femtocell or non-femtocell) in which location registration is permitted, the cellular telephone device 1 enters a reception stand-by state, and can receive a broadcast message such as emergency information as BCSMS.

The cellular telephone device 1 performs outgoing/incoming call processing after performing location registration with any base station; however, in this reception stand-by state, location registration is not performed with any base station, and thus the reception control unit 32 does not accept an ordinary outgoing call. More specifically, even if an outgoing call operation is performed, the cellular telephone device 1 does not perform outgoing call processing for another party that has been input. However, in a case in which the reception control unit 32 detects an outgoing call operation representing an emergency call in this reception stand-by state, the reception control unit 32 performs synchronous processing and location registration with a base station that is in a reception stand-by state for BCSMS, and performs a call request. In other words, in a case in which an outgoing call operation is performed by designating the police or fire station as the other party, the cellular telephone device 1 transmits a parameter representing an emergency call to a base station that is in a reception stand-by state for BCSMS, requests location registration, and makes an outgoing call after performing the location registration.

Here, the display unit 21 displays a screen that indicates whether it is in the reception stand-by state, and notifies the user of whether outgoing/incoming call processing is possible and whether BCSMS reception is possible. More specifically, in the reception stand-by state, the display unit 21 performs, for example, display of "outside a communication area" as well as "emergency alert can be received".

Moreover, in the reception stand-by state, it is preferable for the search unit 31 to search for a base station in a predetermined cycle. In this case, when the search unit 31 finds a new base station that permits location registration, the reception control unit 32 performs location registration with the new base station, and cancels the reception stand-by state where outgoing/incoming call processing is not permitted.

Figure 3:
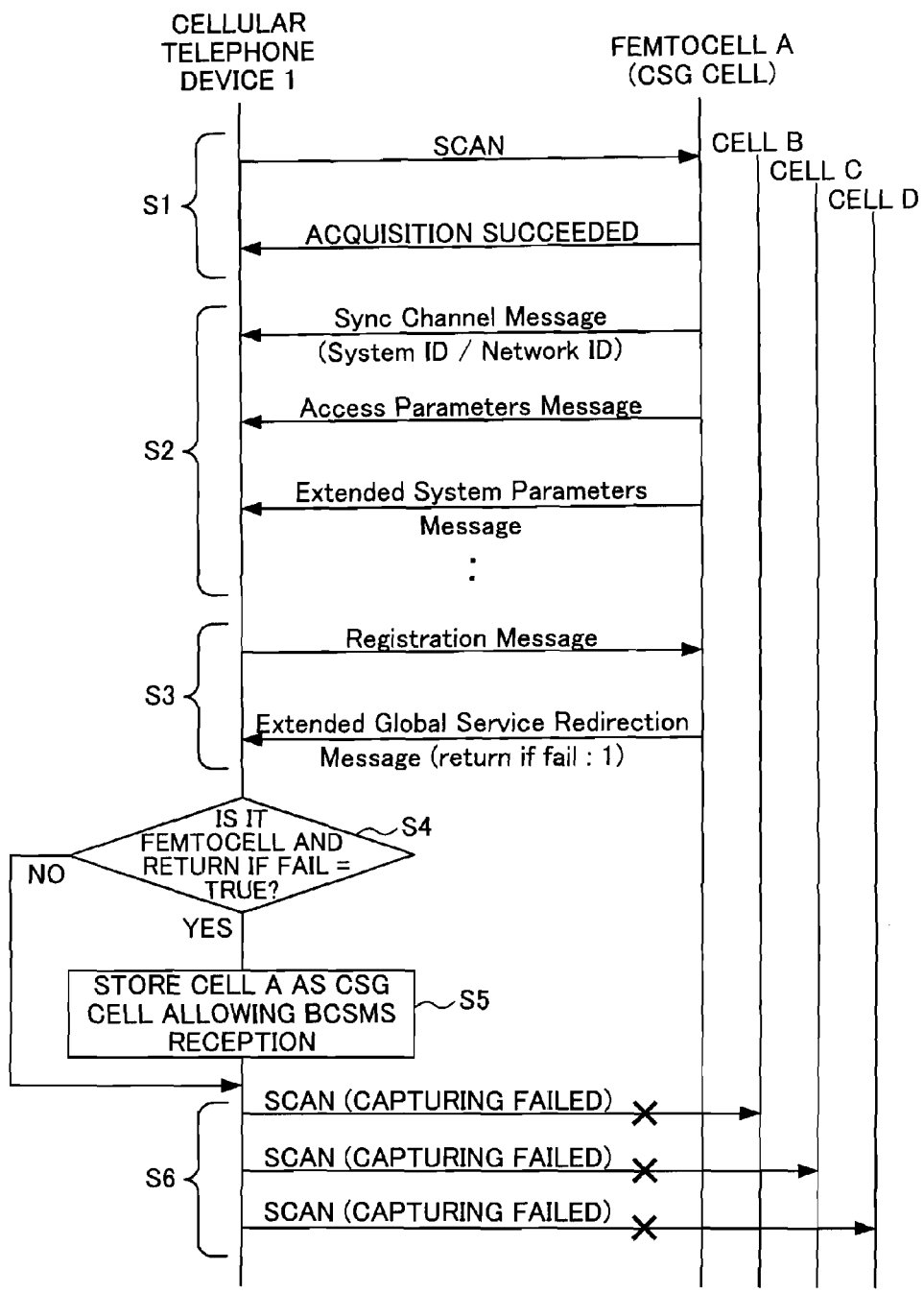
FIG. 3 is a sequence diagram showing processing of searching for a base station according to the embodiment of the present invention.

FIG. 3 is a sequence diagram showing the flow of processing of searching for a base station in the control unit 30 of the cellular telephone device 1 according to the present embodiment.

In Step S1, it is assumed that the control unit 30 (the search unit 31) scans for a base station that can be acquired at a predetermined frequency band via the communication unit 40, and succeeds in acquiring a femtocell A (CSG cell).

In Step S2, the control unit 30 (the search unit 31) sequentially receives an overhead message in a pilot channel of the acquired femtocell A. At this point in time, the cellular telephone device 1 obtains a system identification number (System ID) and a network identification number (Network ID) through a synchronization message (Sync Channel Message).

In Step S3, the control unit 30 (the search unit 31) transmits a location registration message (Registration Message) to the femtocell A. In addition, the control unit 30 (the search unit 31) receives a location registration refusal message (Extended Global Service Redirection Message), in which the aforementioned predetermined parameter (return if fail: 1) is set, as a response.

In Step S4, based on the combination of "System ID" and "Network ID", the control unit 30 (the search unit 31) determines whether the acquired cell is a femtocell and "return if fail: TRUE" was received from "Extended Global Service Redirection Message" in Step S3. In a case in which the determination is YES, the control unit 30 advances the processing to Step S5, and in a case in which the determination is NO, the control unit 30 advances the processing to Step S6.

In Step S5, the control unit 30 (the search unit 31) stores, in the storage unit 50, identification information (PN information) of the femtocell A as a CSG cell in which BCSMS can be received.

In Step S6, the control unit 30 (the search unit 31) further scans cells other than the femtocell A in search for a cell in which location registration is permitted. In this particular example, it is assumed that acquiring the other cells (cells B, C and D) has failed.

Figure 4:
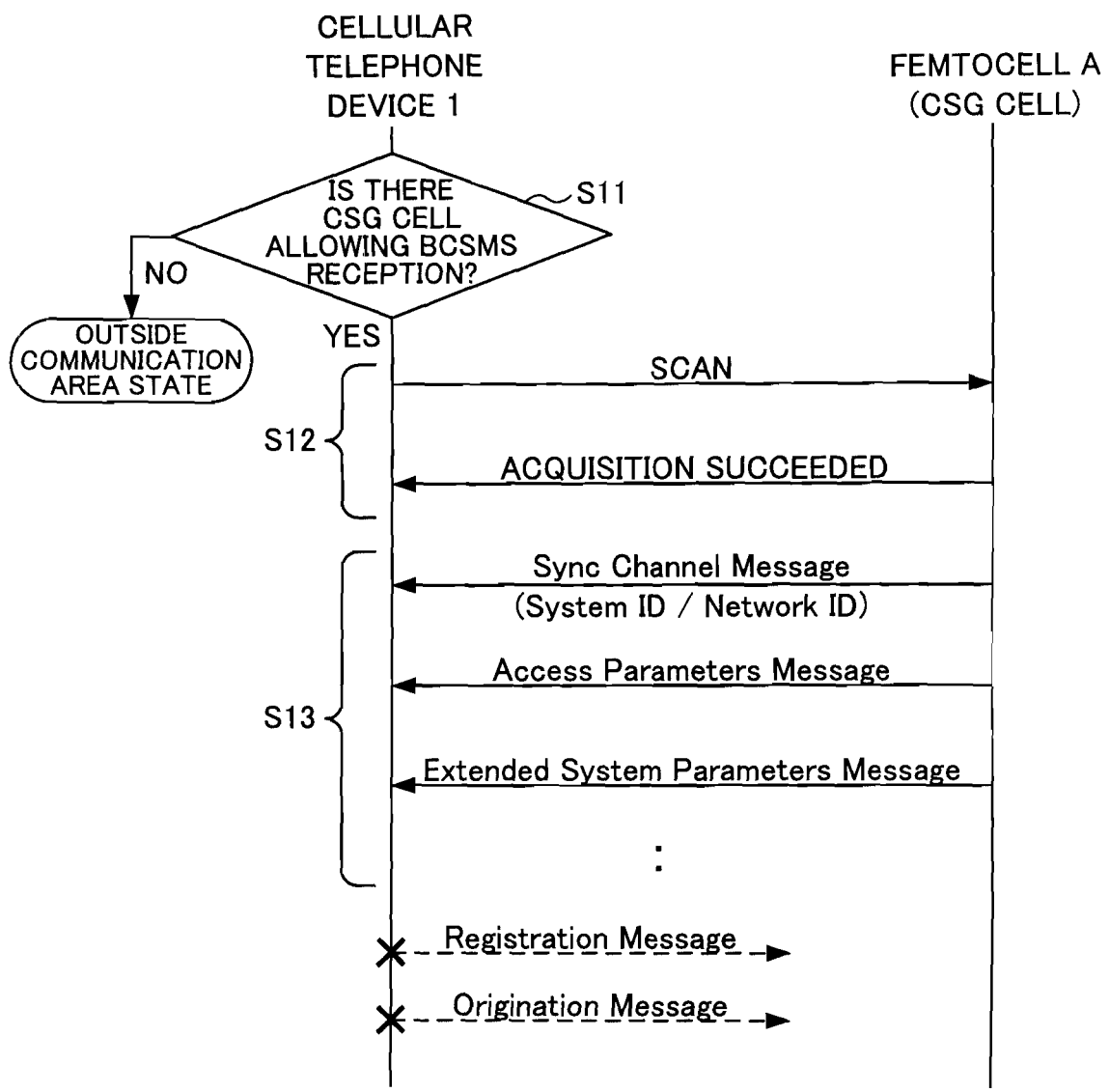
FIG. 4 is a sequence diagram showing processing of transitioning to a reception stand-by state according to the embodiment of the present invention.

Since the location registration has failed in all of the cells, the cellular telephone device 1 attempts to transition to a reception stand-by state for BCSMS. It should be noted that, in a case in which the location registration has succeeded, the cellular telephone device 1 will receive BCSMS from the base station with which the location registration has been completed. FIG. 4 is a sequence diagram showing the flow of processing of transitioning to a reception stand-by state in the control unit 30 of the cellular telephone device 1 according to the present embodiment.

In Step S11, the control unit 30 (the reception control unit 32) determines whether identification information of a CSG cell in which BCSMS can be received is stored in the storage unit 50. In a case in which the determination is YES, the control unit 30 advances the processing to Step S12, and in a case in which the determination is NO, the control unit 30 cannot transition to a reception stand-by state, and thus transitions to a state of being outside a communication area.

In Step S12, based on the identification information stored in the storage unit 50, the control unit 30 (the reception control unit 32) scans CSG cells to acquire the femtocell A.

In Step S13, the control unit 30 (the reception control unit 32) sequentially receives an overhead message in a pilot channel of the acquired femtocell A.

Here, as long as synchronization with a base station is established, a broadcast message as BCSMS can be received, and the cellular telephone device 1 is not necessarily required to have completed location registration with the base station. Therefore, the control unit 30 subsequently does not access the femtocell A, and does not transmit various massages (for example, Registration Message and Origination Message).

Figure 5:
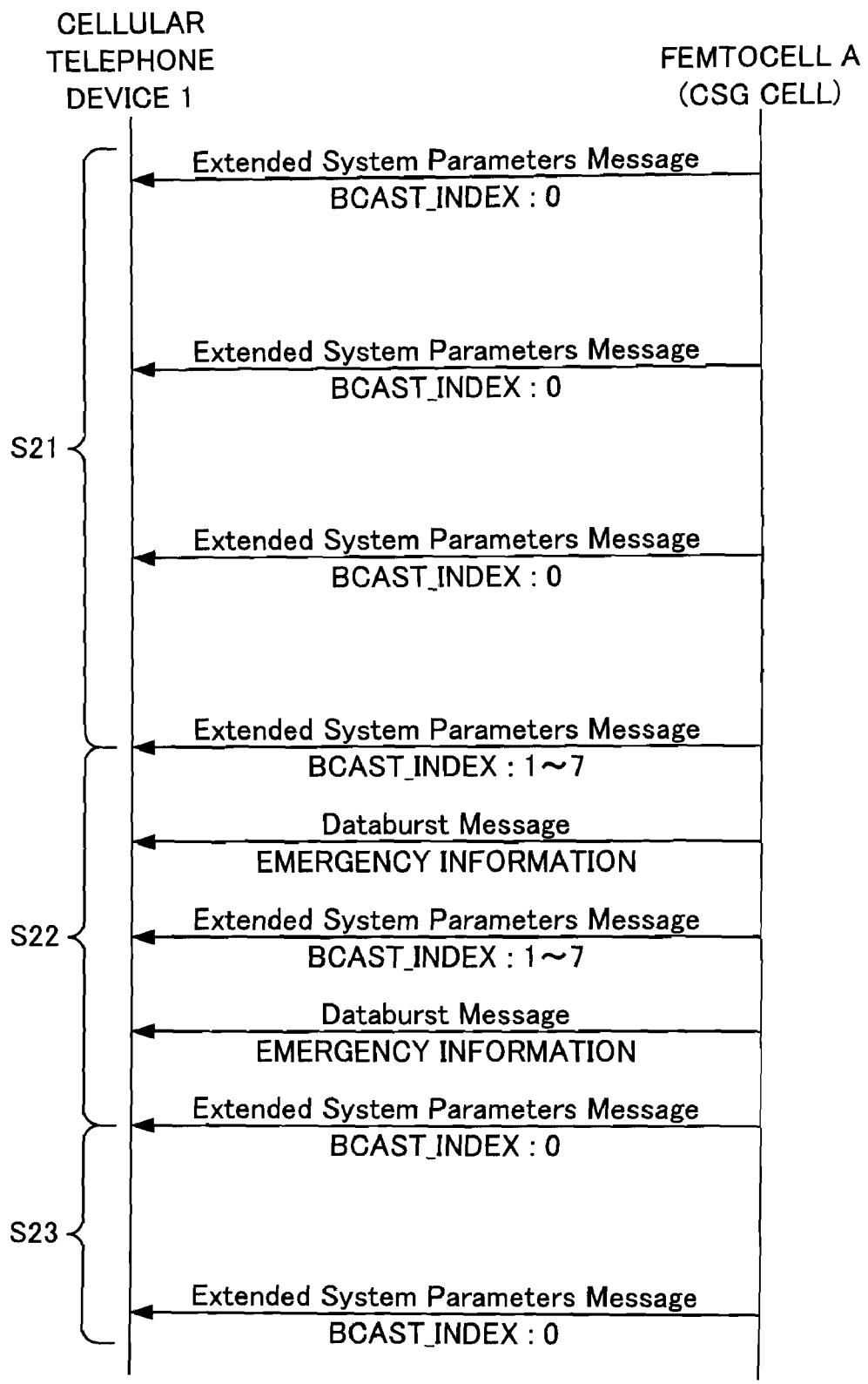
FIG. 5 is a sequence diagram showing processing of receiving BCSMS according to the embodiment of the present invention.

FIG. 5 is a sequence diagram showing the flow of processing of receiving BCSMS in the control unit 30 of the cellular telephone device 1 according to the present embodiment.

In Step S21, the control unit 30 periodically monitors a message (Extended System Parameters Message) of a paging channel for a base station with which code synchronization has been established, and obtains broadcasting information (BCAST_INDEX) regarding transmission of BCSMS. In a case in which there is no transmission as BCSMS, the broadcasting information (BCAST_INDEX) is "0".

In Step S22, when receiving broadcasting information (BCAST_INDEX: 1 to 7) indicating that BCSMS is transmitted from a base station, the control unit 30 monitors a slot at the timing determined by the value of BCAST_INDEX, and receives a message (Databurst Message) including emergency information. At this point in time, since the control unit 30 does not return reception acknowledgement (SMS-Ack), there is no access to the base station, and the load on the base station and the line is not increased.

In Step S23, when the transmission of BCSMS is completed, the control unit 30 receives broadcasting information (BCAST_INDEX: 0) from the base station, and returns to an ordinary monitoring cycle.

It should be noted that, in the processing of receiving BCSMS, for example, in a case of detecting an event such as a format of BCSMS being damaged or tampered, and thus determining that a message transmitted as BCSMS is unlikely to be received, the control unit 30 may cancel the reception stand-by state.

As described above, according to the present embodiment, even in a case in which location registration is refused by a base station in the femtocell, the cellular telephone device 1 can establish code synchronization with the base station, and can transition to a reception stand-by state for BCSMS without accessing the base station. As a result, the cellular telephone device 1 can receive a broadcast message such as emergency information, without increasing the load on the base station that refused location registration and on the communication line.

Moreover, by receiving location registration refusal information (Global Service Redirection Message) from the femtocell, the cellular telephone device 1 can recognize that the femtocell is a CSG cell. Furthermore, by receiving, for example, "return if fail" as a parameter to permit reception of BCSMS, the cellular telephone device 1 can clearly determine that transition to a reception stand-by state is possible. It should be noted that, conversely, in a case in which a communication common carrier or an administrator of a CSG cell can set a parameter not to permit reception of BCSMS, the cellular telephone device 1 may transition to a reception stand-by state by not receiving such a refusal parameter.

In addition, the cellular telephone device 1 does not accept an outgoing/incoming call operation in the reception stand-by state, and thus does not access a base station with which code synchronization has been established. However, even in the reception stand-by state, the cellular telephone device 1 accepts an emergency call to perform a call request for a base station, and thus can ensure convenience in an emergency.

Moreover, since the cellular telephone device 1 displays, and notifies the user of, whether it is in a reception stand-by state, the user can easily know whether an outgoing/incoming call is possible and whether reception of BCSMS is possible.

In addition, in a case in which the cellular telephone device 1 was able to acquire another cell when it is in the reception stand-by state in a CSG cell, the cellular telephone device 1 attempts to perform location registration. Therefore, the cellular telephone device 1 can reduce the time of the reception stand-by state in which an outgoing/incoming call cannot be performed as much as possible.

Although an embodiment of the present invention has been described above, the present invention is not limited to the aforementioned embodiment. Moreover, the effects described in the embodiment of the present invention merely exemplify the most preferable effects arising from the present invention, and the effects according to the present invention are not limited to those described in the embodiment of the present invention.

BCSMS in the aforementioned embodiment is merely an example in the CDMA2000_1x standard, and it may be a broadcast service in an approximated cell that conforms to 3GPP. For example, in LTE, e-MBMS (Multimedia Broadcast and Multicast Service) may be used.

Furthermore, the wireless terminal device according to the present invention is not limited to the cellular telephone device 1, and it may be applied to various terminal devices such as a PHS (trademark: Personal Handyphone System) and a PEA (Personal Digital Assistant), and in addition, a gaming machine, a navigation device, a personal computer and the like.

What is claimed is:

1. A wireless terminal device that performs outgoing/incoming call processing via a base station with which location registration has been completed, the wireless terminal device comprising:
   a search unit that searches for a base station, from which a signal can be received; and
   a control unit that, in a case in which location registration is not permitted in all base stations found by the search unit, performs synchronous processing for a reception signal from one of the base stations in which location registration was not permitted, without performing location registration, and enters a reception stand-by state for a broadcast message from the one of the base stations.

2. The wireless terminal device according to claim 1, wherein the control unit enters the reception stand-by state in response to receiving refusal information relating to the location registration from the one of the base stations that did not permit the location registration.

3. The wireless terminal device according to claim 2, wherein the control unit enters the reception stand-by state, in a case in which the refusal information includes reception permission data for the broadcast message.

4. The wireless terminal device according to claim 2, wherein the control unit enters the reception stand-by state, in a case in which the refusal information does not include reception refusal data for the broadcast message.

5. The wireless terminal device according to claim 1, wherein the control unit does not accept an outgoing call operation in the reception stand-by state.

6. The wireless terminal device according to claim 1, wherein, in the reception stand-by state,
- in a case of detecting an outgoing call operation representing an emergency call, the control unit performs location registration and a call request for the one of the base stations with which the synchronous processing has been performed, and
- in a case of detecting other outgoing call operations, the control unit does not accept the outgoing call operations.

7. The wireless terminal device according to claim 1, further comprising a display unit that displays a screen to indicate whether or not being in the reception stand-by state.

8. The wireless terminal device according to claim 1,
- wherein the search unit searches for a base station in a predetermined cycle in the reception stand-by state, and
- wherein, in a case in which the search unit finds a new base station that permits location registration, the control unit performs location registration with the new base station, and cancels the reception stand-by state.

9. The wireless terminal device according to claim 3, wherein the reception permission data is a predetermined parameter defined in 3GPP2.

10. The wireless terminal device according to claim 1, wherein the broadcast message is transmitted as BCSMS including emergency information.

11. A method of controlling a wireless terminal device including a control unit that performs outgoing/incoming call processing via a base station with which location registration has been performed, the method comprising the steps of:
- searching for a base station, from which a signal can be received by the control unit; and
- controlling such that, in a case in which location registration of the control unit was not permitted in all base stations found in the step of searching, synchronous processing is performed for a reception signal from one of the base stations in which location registration was not permitted, without performing location registration, and the control unit enters a reception stand-by state for a broadcast message from the one of the base stations.

* * * * *